United States Patent

Wang

[11] Patent Number: 6,080,262
[45] Date of Patent: Jun. 27, 2000

[54] METHOD FOR FORMING AN ENCLOSURE ON A FERROUS CORE

[75] Inventor: We-Chuan Wang, Tu-Chen, Taiwan

[73] Assignee: Hon Hai Precision Ind. Co., Ltd., Taipei Hsien, Taiwan

[21] Appl. No.: 09/176,660

[22] Filed: Oct. 21, 1998

[30] Foreign Application Priority Data

Oct. 21, 1997 [TW] Taiwan ................................. 86115652

[51] Int. Cl.⁷ ............................ B32B 31/12; H01F 17/06; B29C 45/14
[52] U.S. Cl. ......................... 156/245; 156/294; 336/175; 264/275; 264/279
[58] Field of Search ............................ 156/52, 245, 294; 264/271.1, 275, 279; 336/175; 174/32, 33, 34, 35 R, 36

[56] References Cited

U.S. PATENT DOCUMENTS

| 4,823,103 | 4/1989 | Nakagawa et al. | 336/175 |
| 5,990,756 | 11/1999 | France, Jr. et al. | 336/175 |

*Primary Examiner*—Michael W. Ball
*Assistant Examiner*—Michael A Tolin

[57] ABSTRACT

A method for forming an enclosure on an outer face of a ferrous core comprises the steps of 1) mounting a ferrous core on a first mold; 2) disposing the first molding assembly together with the ferrous core into a second mold; 3) injecting an insulative material into the second mold to enclose the ferrous core; 4) removing the enclosed core from the second mold; and 5) ejecting the enclosed core from the first mold.

1 Claim, 4 Drawing Sheets

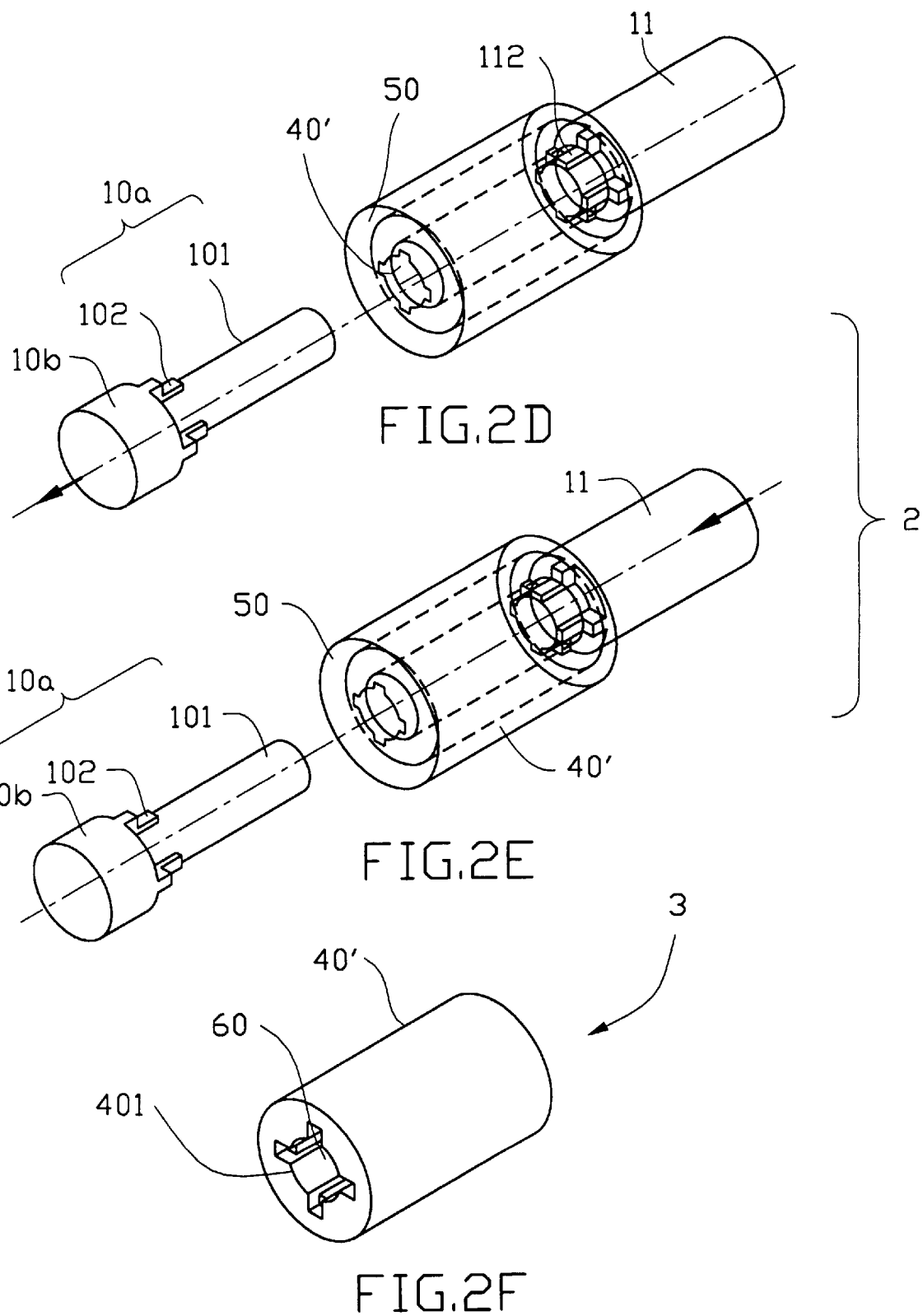

METHOD FOR FORMING AN ENCLOSURE ON A FERROUS CORE

FIELD OF THE INVENTION

The present invention relates to a method, and more particularly to a method for forming an enclosure on a ferrous core used on a cable thereby eliminating EMI interference exposed thereto.

DESCRIPTION OF THE PRIOR ART

Conventionally, a ferrous core is assembled to a cable or harness to eliminate an EMI interference affected thereto. In an existing process for assembly of the core and the cable, the core is firstly disposed within a mold, then the cable is passed through a passage within the core. Then a plastic material is injected into the mold to enclose the core and cable. Even this functions, it has the following defects.

1. The throughput can not be hastened. Each time the cable shall be accurately aligned with the passage of the core. This is laborious and adversely hinders the production. On the other hand, after the core and the cable are molded, it must be removed from the mold for further molding. Accordingly, the throughput can not be hastened.

2. Since the core and the cable are supported by supporting pins projected into the mold, there are molding holes defined on the product. The overall aesthetic appearance of the product is negatively affected. Additionally, if the cable and core are not supported centrally within the mold, the product will be rejected.

SUMMARY OF THE INVENTION

An objective of this invention is to provide a method for forming an enclosure on an outer face of a ferrous core. The enclosed core can be automatically ejected from a mold thereby facilitating quick production of the enclosed core.

Another objective of this invention is to provide an enclosed ferrous core wherein an enclosure is formed with grasping portions by which an outer face of a cable can be firmly grasped.

In order achieve the objectives set forth, a method for forming an enclosure on an outer face of a ferrous core comprises the steps of 1) mounting a ferrous core on a first mold; 2) disposing the first molding assembly together with the ferrous core into a second mold; 3) injecting an insulative material into the second mold to enclose the ferrous core; 4) removing the enclosed core from the second mold; and 5) ejecting the enclosed core from the first mold.

An enclosure for enclosing a ferrous core defining a central passage comprises an outer shell suitable for assembling to an outer face of the ferrous core. An end wall of the shell defines an opening in alignment with the passage and forms a plurality of grasping portions along an inner perimeter for providing interferential engagement with an outer face of a cable.

These and other objectives, features, and advantages of the present invention will become apparent after reading the following detailed description of the preferred embodiment of the invention taken in conjunction with the appended drawings.

BRIEF DESCRIPTION OF THE DRAWING

FIG. 2D is a perspective view in which a first portion of the first mold is separated from the enclosed ferrous core;

FIG. 2E is a perspective view showing an external force is applied to eject the enclosed core;

FIG. 2F is a perspective view of the enclosed ferrous core; and

DETAILED DESCRIPTION OF PREFERRED EMBODIMENT

Figure 1:
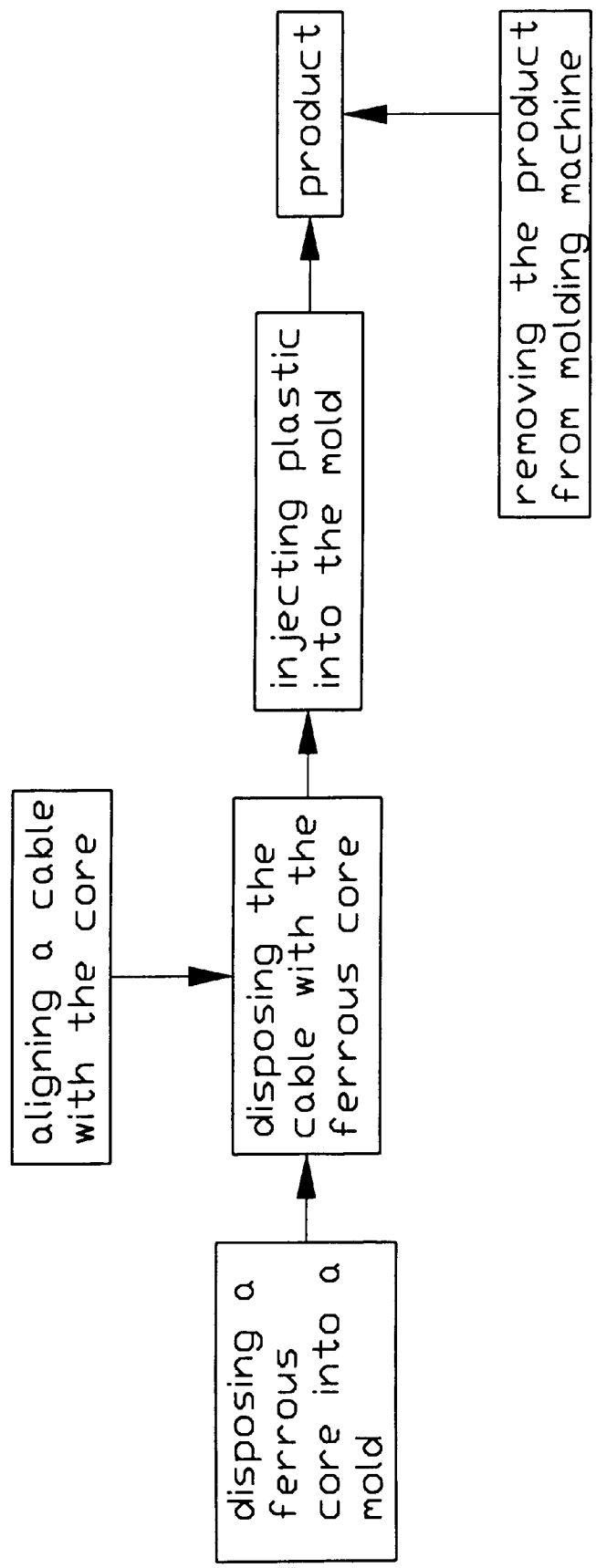
FIG. 1 is a flow chart of conventional process for assembling a cable with a ferrous core.

Referring to FIGS. 2A to 2F, describing a mounting step 1, an ejecting step 2, and a coating step 3 for forming an enclosed ferrous core 40.

The ferrous core 40 is assembled to a first mold 10 including a first portion 10a, and a second portion 11. The first portion 10a includes a head 10b and a first stem portion 101 extending from an end of the heat 10b. An L-shaped wedge 102 is formed between the head 10b and the first stem portion 101. The ferrous core 40 defines a passage 401 in which the first stem portion 101 can be removably received therein. The first mold 10 further includes a second portion 11 having a second stem portion 11a extending from an end thereof. An L-shaped portion 112 is formed on the stem portion 11a adjacent to the second portion 11.

Figure 2A:
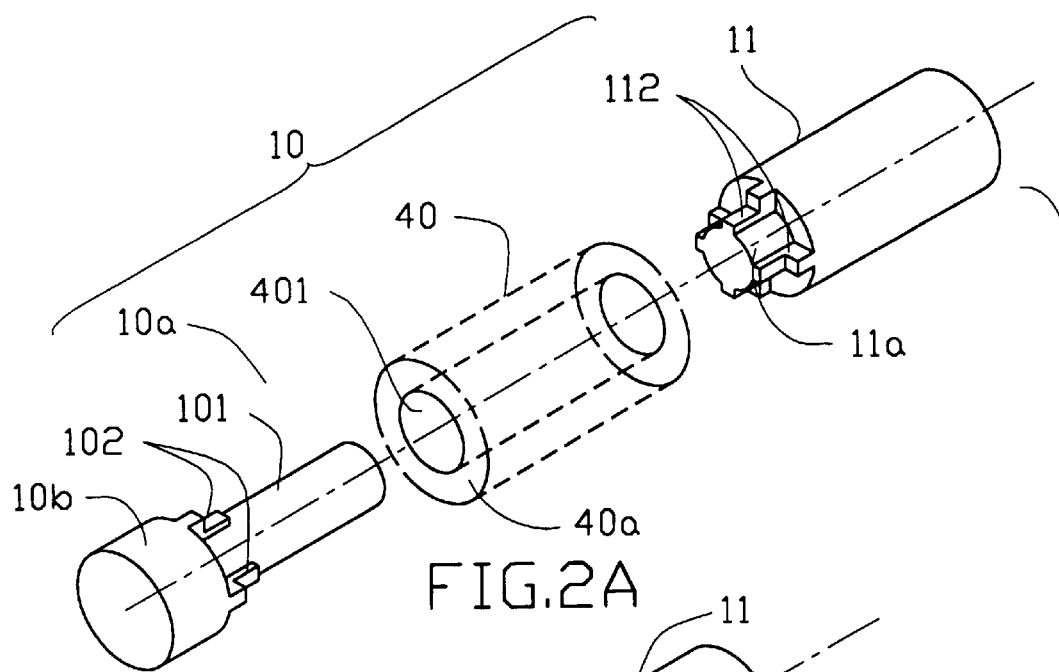
FIG. 2A is a perspective view showing a ferrous core and a first mold before assembly.
Figure 2B:
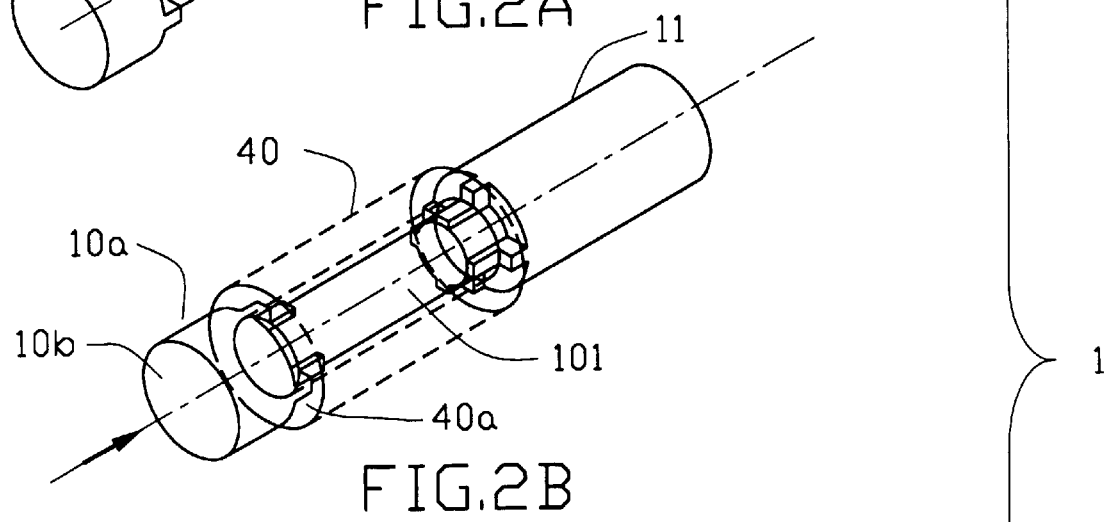
FIG. 2B is an assembled view of FIG. 2A.
Figure 2C:
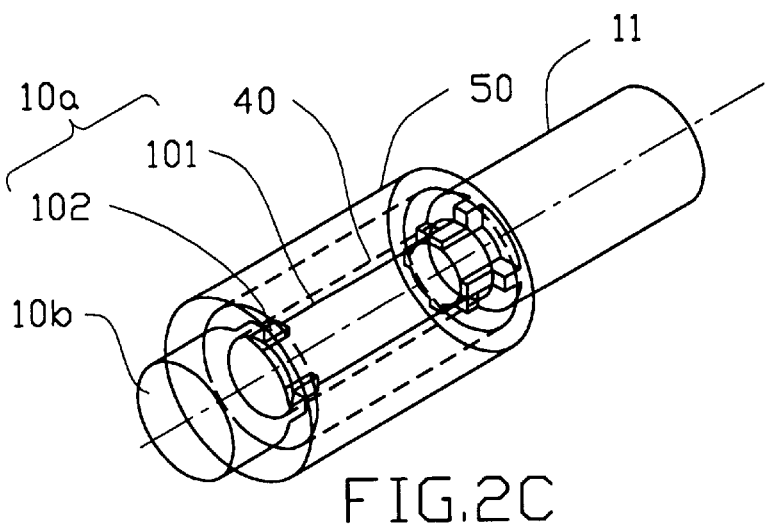
FIG. 2C is an assembled view in which an insulative enclosure is formed.

Referring to FIG. 2B, when the ferrous core 40 is assembled to the first mold 10, elongated portions of the L-shaped wedge 102, 112 insert into the passage 401 from opposite ends and traverse portion of the L-shaped wedge 102, 112 abut against an end portion 40a of the ferrous core 40. Additionally, an end of the first stem portion 101 abuts against to an end of the second stem portion 11a thereby completely sealing the passage 401.

After the ferrous core 40 is assembled to the first mold 10, the ferrous core 40 is moved to a second mold (not shown) for molding. After ejecting plastic material into the second mold, an enclosure 50 is integrally formed with the ferrous core 40, as shown in FIG. 2F.

Referring to FIGS. 2D and 2E, after the plastic material of the shell 50 is cured, the first portion 10a of the first mold 10 is withdrawn from the enclosed ferrous core 40. Then an axial force is applied along the second portion 11 to eject the enclosed core 40 from the second portion 11. At last, the ferrous core 40 is enclosed with the insulative shell 50.

Figure 3:
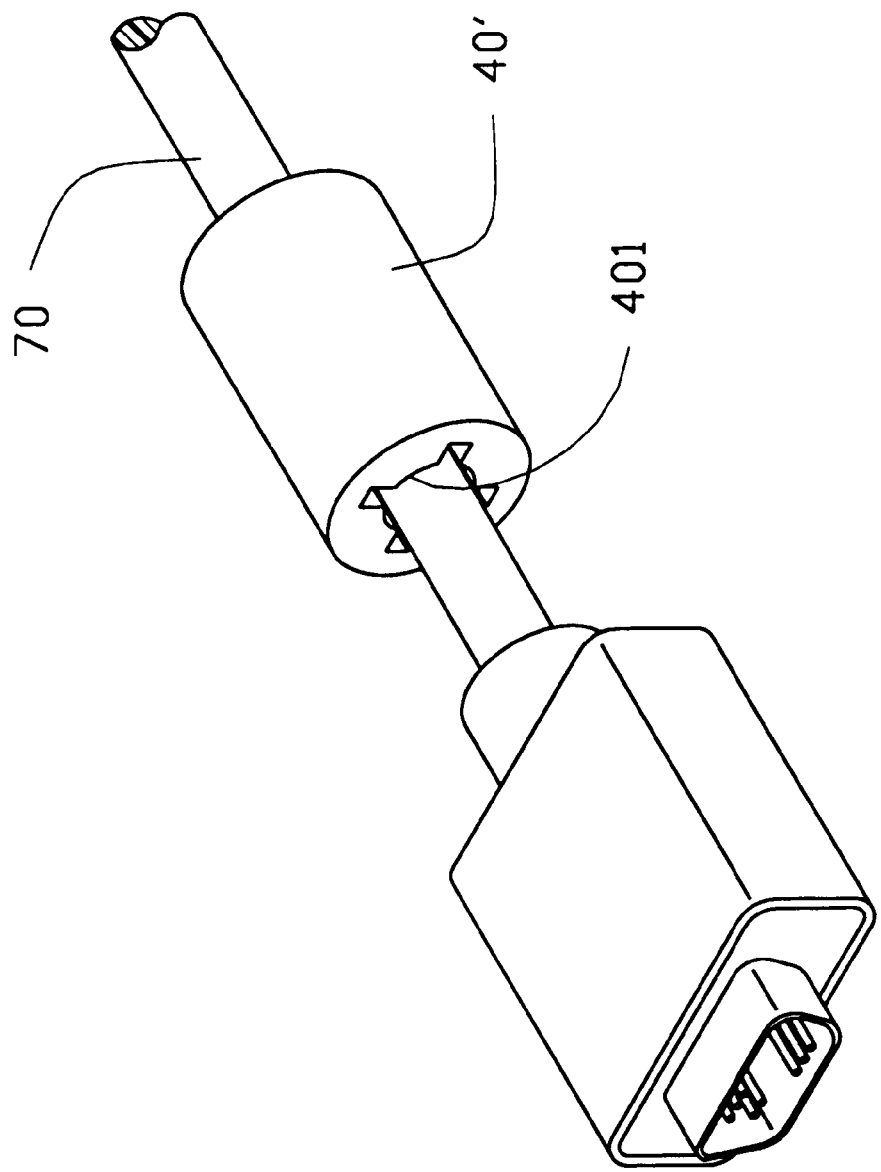
FIG. 3 is a perspective view of a cable assembled with the enclosed core in accordance with the present invention.

Before the enclosed core 40' is assembled to a cable 70, a layer of adhesive 60 is deployed to an inner face of the passage 401. Then the enclosed core 40' is assembled to the cable thereby securely attached thereto, as shown in FIG. 3.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims. Therefore, persons of ordinary skill in this field are to understand that all such equivalent structures are to be included within the scope of the following claims.

I claim:

1. A method of assembling a ferrous core to a cable, the steps comprising:

providing a tubular ferrous core;

providing a first mold including a first portion and a second portion, said first portion including stem portion dimensioned to comply with a central passage of the ferrous core;

positioning said first portion and said second portion sandwiching the ferrous core with the stem portion of the first mold extending through said passage;

injecting an insulative material to apply said material to an outer surface of the ferrous core without applying said material to the passage;

ejecting the ferrous core from the first mold;

applying an adhesive to an inner surface of the ferrous core in the passage; and positioning said cable extending through said passage and fastening the cable to the ferrous core.

* * * * *